United States Patent
Byun et al.

(10) Patent No.: US 7,248,425 B2
(45) Date of Patent: Jul. 24, 2007

(54) DISK WRITING/REPRODUCING APPARATUS AND METHOD

(75) Inventors: Yong-kyu Byun, Yongin-si (KR); Takao Sugawara, Yokohama-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/302,379

(22) Filed: Dec. 14, 2005

(65) Prior Publication Data

US 2006/0132956 A1   Jun. 22, 2006

(30) Foreign Application Priority Data

Dec. 14, 2004   (JP) ............................. 2004-361135
Apr. 6, 2005   (KR) ...................... 10-2005-0028546

(51) Int. Cl.
*G11B 5/09* (2006.01)
*G11B 27/36* (2006.01)
*G11B 5/596* (2006.01)

(52) U.S. Cl. ........................... 360/48; 360/31; 360/39; 360/51

(58) Field of Classification Search ..................... None
See application file for complete search history.

(56) References Cited

U.S. PATENT DOCUMENTS

| | | | | |
|---|---|---|---|---|
| 5,534,695 A | * | 7/1996 | Miyoshi et al. | 250/330 |
| 6,124,998 A | * | 9/2000 | Kanegae | 360/68 |
| 6,697,958 B1 | * | 2/2004 | Yada et al. | 714/6 |
| 2005/0073761 A1 | * | 4/2005 | Aida et al. | 360/46 |

* cited by examiner

*Primary Examiner*—Andrea Wellington
*Assistant Examiner*—Jason Olson
(74) *Attorney, Agent, or Firm*—Sughrue Mion, PLLC

(57) ABSTRACT

A disk writing apparatus includes: a temperature sensor sensing an ambient temperature of a disk; a sync mark generator generating a sync mark having a pattern when a writing temperature indicating an ambient temperature at which data is written on the disk is sensed, wherein the pattern of the sync mark corresponds to the sensed writing temperature; a writing controller outputting the writing temperature sensed by the temperature sensor to the sync mark generator; a multiplexer adding the sync mark generated by the sync mark generator to the data; and a writing unit writing the data to which the sync mark is added on the disk. Accordingly, error rates when data is written and when data is reproduced can be improved by optimally compensating for the disk writing temperature and the disk reproducing temperature using parameters of devices of an hard disk drive.

28 Claims, 5 Drawing Sheets

DISK WRITING/REPRODUCING APPARATUS AND METHOD

CROSS-REFERENCE TO RELATED PATENT APPLICATION

This application claims priority from Japanese Patent Application No. 2004-361135, filed on Dec. 14, 2004 in the Japanese Patent Office, and Korean Patent Application No. 10-2005-0028546, filed on Apr. 6, 2005, in the Korean Intellectual Property Office, the disclosures of which are incorporated herein in their entirety by reference.

BACKGROUND OF THE INVENTION

1. Field of the Invention

Apparatuses and methods consistent with the present invention relate to writing/reproducing in a hard disk drive (HDD), and more particularly, to disk writing and reproducing which compensate for parameters of components of an HDD according to ambient temperatures when data is written on and is reproduced from a disk.

2. Description of the Related Art

The characteristics of disks and heads in an HDD change with a variation of an ambient temperature, thereby affecting data reliability due to a change of a reproducing signal. To prevent this, in the prior art, an ambient temperature in an HDD is measured using a temperature sensor such as a thermistor, and a write current or write pre-compensation signal is optimized according to the temperature in a writing operation. In a reproducing operation, a method of optimizing a filter in a read channel (RDC) according to the ambient temperature is used.

However, even if the compensation method is used in the writing operation, a perfect compensation is impossible since a reproducing signal in a case where data is written at high temperature is different from a reproducing signal in a case where data is written at low temperature. In addition, the compensation method in the reproducing operation considers only the ambient temperature in the reproducing operation without considering the ambient temperature in the writing operation. Thus, since the compensation is performed using the same parameters in both cases when data written at a high temperature is reproduced and when data written at a low temperature is reproduced, a proper compensation cannot be achieved. Thus, the reproducing quality in the reproducing operation is degraded.

SUMMARY OF THE INVENTION

The present invention provides a disk writing apparatus for generating a sync mark including information on an ambient temperature at which data is written.

The present invention also provides a disk reproducing apparatus for setting HDD parameters according to ambient temperatures at which data is written and is reproduced.

The present invention also provides a disk writing method of generating a sync mark including information on an ambient temperature at which data is written.

The present invention also provides a disk reproducing method of setting HDD parameters according to ambient temperatures at which data is written and is reproduced.

According to an aspect of the present invention, there is provided a disk writing apparatus comprising: a temperature sensor sensing an ambient temperature of a disk; a sync mark generator generating a sync mark having a pattern when a writing temperature indicating an ambient temperature at which data is written on the disk is sensed, wherein the pattern of the sync mark corresponds to the sensed writing temperature; a writing controller outputting the writing temperature sensed by the temperature sensor to the sync mark generator; a multiplexer adding the sync mark generated by the sync mark generator to the data; and a writing unit writing the data to which the sync mark is added on the disk.

According to another aspect of the present invention, there is provided a disk reproducing apparatus comprising: a temperature sensor sensing an ambient temperature of a disk; a reproducing unit reproducing data written on the disk; a sync mark detector detecting a sync mark from the data reproduced by the reproducing unit; a parameter setting controller controlling the setting of parameters of the reproducing unit according to a writing temperature, which indicates an ambient temperature at which the data was written and is obtained from the detected result of the sync mark detector, and a reproducing temperature, which indicates an ambient temperature at which the data is to be reproduced; and a reproducing controller outputting a reproducing temperature to the parameter setting controller when the reproducing temperature is sensed by the temperature sensor.

According to another aspect of the present invention, there is provided a disk writing method comprising: sensing a writing temperature indicating an ambient temperature at which data is written on a disk; generating a sync mark having a pattern corresponding to the sensed writing temperature; adding the generated sync mark to the data; and writing on the disk the data to which the sync mark has been added.

According to another aspect of the present invention, there is provided a disk reproducing method comprising: reproducing data written on a disk; detecting a sync mark from the data written on the disk; and setting parameters of a reproducing unit reproducing the written data according to an ambient temperature at which the data was written, which is determined from the detected sync mark, and a reproducing temperature indicating an ambient temperature at which the written data is reproduced.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Exemplary embodiments of the present invention will now be described in detail with reference to the accompanying drawings.

Figure 1:
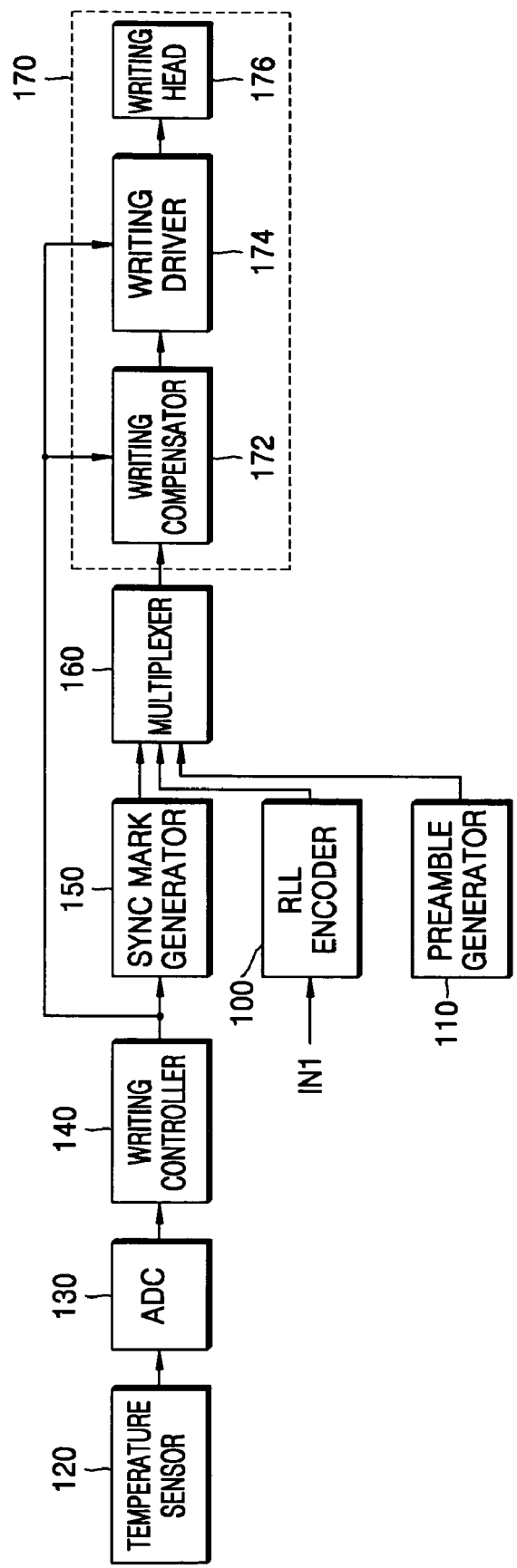
FIG. 1 is a block diagram of a disk writing apparatus according to an exemplary embodiment of the present invention.

FIG. 1 is a block diagram of a disk writing apparatus according to an exemplary embodiment of the present invention. Referring to FIG. 1, the disk writing apparatus includes a run length limited (RLL) encoder 100, a preamble generator 110, a temperature sensor 120, an analog-to-digital converter (ADC) 130, a writing controller 140, a sync mark generator 150, a multiplexer 160, and a writing unit 170.

The RLL encoder 100 encodes data input through an input terminal IN1 so as to correspond to a k constraint condition. An error correction code and an error detection code are added to the data input through the input terminal IN1.

RLL encoding is to encode data by limiting the data so that a code "1" or "0" is not continued more than a predetermined number k. The data encoded by the RLL encoder 100 is output to the data adder 160.

The preamble generator 110 generates a preamble for a clock in a head of the data and outputs the generated preamble to the multiplexer 160. The preamble is a signal used to synchronize transmission timing between read and write process. The proper timing guarantees all systems to correctly analyze a beginning of information transmission.

The temperature sensor 120 senses an ambient temperature and outputs the sensed result to the ADC 130. In particular, the temperature sensor 120 senses the ambient temperature at which data is written on a disk (not shown). A thermistor, which is a semiconductor whose resistance varies depending on temperature, is used as the temperature sensor 120.

The ADC 130 converts an analog signal of the ambient temperature sensed by the temperature sensor 120 to a digital signal and outputs the converted digital signal of the ambient temperature to the writing controller 140.

The writing controller 140 outputs a writing temperature indicating the ambient temperature at which the data is written among ambient temperatures corresponding to digital signals received from the ADC 130 to the sync mark generator 150.

In addition, the writing controller 140 outputs the writing temperature to the writing unit 170.

When the writing temperature is sensed by the temperature sensor 120, the sync mark generator 150 generates a sync mark having a pattern corresponding to the sensed writing temperature and outputs the generated sync mark to the multiplexer 160. The sync mark indicates the head of data to be written. When generating a sync mark, the sync mark generator 150 generates the sync mark having the pattern corresponding to the sensed writing temperature.

The multiplexer 160 adds the preamble received from the preamble generator 110 and the sync mark received from the sync mark generator 150 to the data encoded by the RLL encoder 100 and outputs the data to which the preamble and the sync mark are added to the writing unit 170.

Figure 2A:
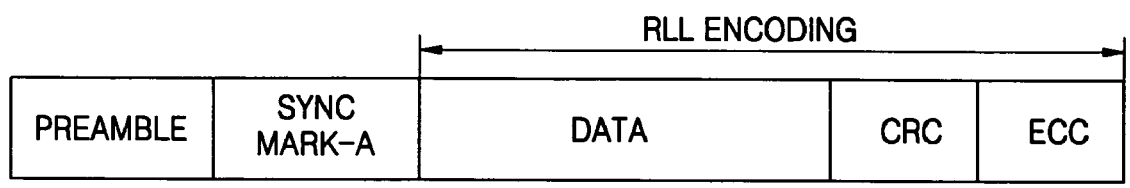
FIGS. 2A through 2C are structural diagrams of data to which a preamble and first through third sync marks, respectively, are added.
Figure 2B:
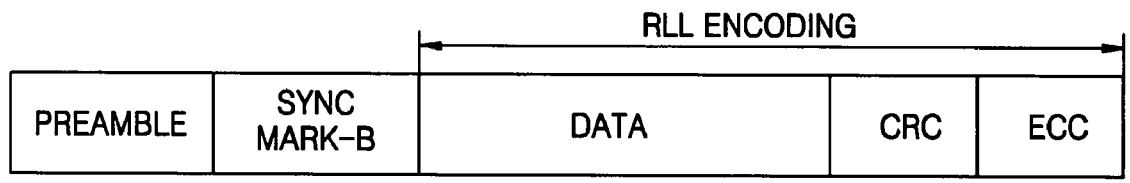
Figure 2C:
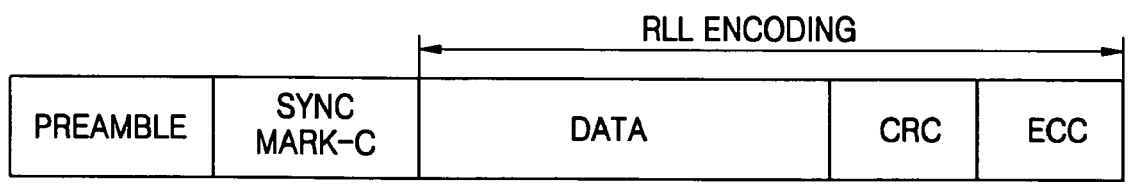

FIGS. 2A through 2C are structural diagrams of data to which a preamble and sync marks (sync mark-A, sync mark-B and sync mark-C) are added, respectively. An error detection code (e.g., a cyclic redundancy code (CRC) code) and an error correction code are added to each data to which the preamble and each of sync marks are added in each rear portion. The sync marks illustrated in FIGS. 2A through 2C are marks having different patterns according to writing temperatures at which data is written. For example, if an ambient temperature at which data is written is low, the sync mark-A illustrated in FIG. 2A is added to the data, and if the ambient temperature at which the data is written is a normal temperature, the sync mark-B illustrated in FIG. 2B is added to the data, and if the ambient temperature at which the data is written is high, the sync mark-C illustrated in FIG. 2C is added to the data.

The writing unit 170 records on the disk data to which a preamble and a sync mark are added. The writing unit 170 includes a writing compensator 172, a writing driver 174, and a writing head 176.

The writing compensator 172 pre-compensates for transition positions in a direction in which data has been written. In general, the writing compensator 172 is called a write pre-compensation circuit. When data is written on the disk, if the transition positions of writing directions are getting close, a mismatch of the transition positions occurs due to distortion of a waveform by a magnetic interference. The writing compensator 172 predicts this mismatch and prevents the occurrence of the mismatched transition positions by compensating for a predetermined amount of mismatch.

The amount of compensation by the writing compensator 172 is properly set according to the writing temperature received from the writing controller 140.

The writing driver 174 controls the writing head 176 to record on the disk the data whose transition positions are pre-compensated for.

A writing current and an overshoot of the writing driver 174 are properly set according to the writing temperature received from the writing controller 140.

The writing head 176 records on the disk the data whose transition positions have been compensated for under the control of the writing driver 174.

Figure 3:
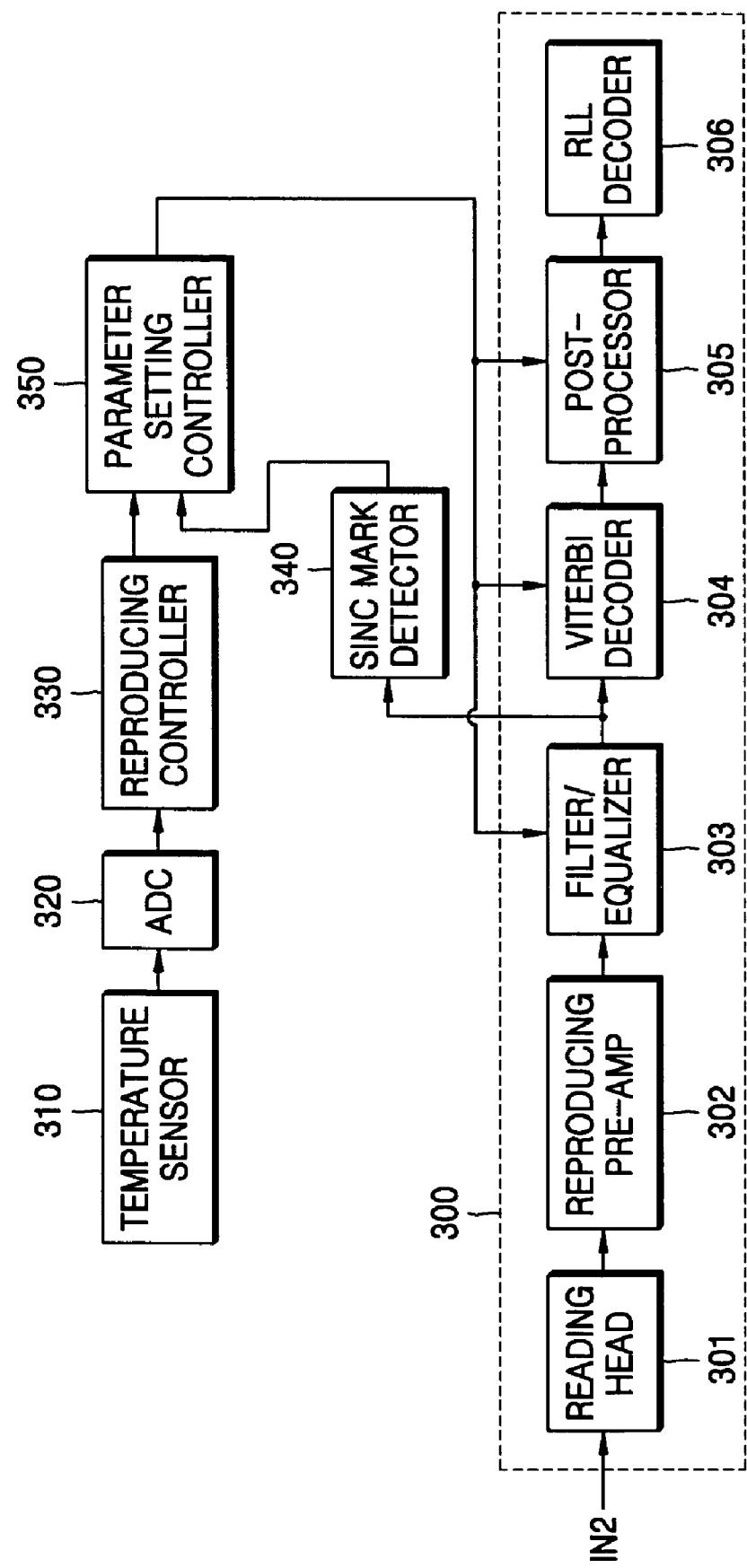
FIG. 3 is a block diagram of a disk reproducing apparatus according to an exemplary embodiment of the present invention.

A disk reproducing apparatus according to an exemplary embodiment of the present invention will now be described with reference to FIG. 3. FIG. 3 is a block diagram of the disk reproducing apparatus according to an exemplary embodiment of the present invention. Referring to FIG. 3, the disk reproducing apparatus includes a reproducing unit 300, a temperature sensor 310, an ADC 320, a reproducing controller 330, a sync mark detector 340, and a parameter setting controller 350.

The reproducing unit 300 reproduces data written on a disk (not shown). The reproducing unit 300 includes a reading head 301, a reproducing pre-amplifier 302, a filter/equalizer 303, a Viterbi decoder 304, a post-processor 305, and an RLL decoder 306.

The reading head 301 reads the data written on the disk and outputs the read data to the reproducing pre-amplifier 302.

The reproducing pre-amplifier 302 outputs the read data to the filter/equalizer 303.

The filter/equalizer 303 performs noise reduction and waveform equalization on the data received from the reproducing pre-amplifier 302 and outputs the noise-reduced and waveform-equalized data to the Viterbi decoder 304 and the sync mark detector 340.

The Viterbi decoder 304 decodes the noise-reduced and waveform-equalized data using a trellis diagram and outputs the decoded data to the post-processor 305.

The post-processor 305 corrects errors of the decoded data and outputs the error-corrected data to the RLL decoder 306.

The RLL decoder 306 RLL-decodes the error-corrected data. The RLL decoding is an inverse process of the RLL encoding.

The temperature sensor 310 senses an ambient temperature and outputs the sensed result to the ADC 320. In particular, the temperature sensor 310 senses the ambient temperature at which data is reproduced from the disk, i.e., a reproducing temperature. A thermistor, which is a semiconductor component whose resistance changes depending on temperature, is used as the temperature sensor 310.

The ADC 320 converts an analog signal of the ambient temperature sensed by the temperature sensor 310 to a digital signal and outputs the converted digital signal of the ambient temperature to the reproducing controller 330.

The reproducing controller 330 outputs the digital signal of the reproducing temperature to the parameter setting controller 350.

The sync mark detector 340 detects a sync mark from the data provided by the filter/equalizer 303 included in the reproducing unit 300 and outputs the detected result to the parameter setting controller 350. The data written on the disk includes a sync mark having a different pattern according to the writing temperature, as illustrated in FIG. 2A, 2B, or 2C. When the data is reproduced, the sync mark detector 340 detects the sync mark included in the data provided by the filter/equalizer 303. After the sync mark is detected, the writing temperature is obtained. The sync mark detector 340 can detect the writing temperature, which is the ambient temperature at which the data is written, and outputs the detected writing temperature to the parameter setting controller 350.

The parameter setting controller 350 receives the writing temperature from the sync mark detector 340 and receives a reproducing temperature, i.e., an ambient temperature at which the data is reproduced, from the reproducing controller 330. The parameter setting controller 350 controls the filter/equalizer 303, the Viterbi decoder 304, and the post-processor 305, which are included in the reproducing unit 300, to set their parameters to correspond to the received writing temperature and reproducing temperature. To do this, the parameter setting controller 350 contains a parameter table. An example of the parameter table is shown in Table 1.

TABLE 1

| | | Reproducing temperature | | |
|---|---|---|---|---|
| | | Low temperature | Normal temperature | High temperature |
| Writing temperature | Low temperature | LL | LN | LH |
| | Normal temperature | NL | NN | NH |
| | High temperature | HL | HN | HH |

As shown in Table 1, if the writing temperature is low and the reproducing temperature is low, the parameter setting controller 350 controls the filter/equalizer 303, the Viterbi decoder 304, and the post-processor 305 to set their parameters according to parameter setting values corresponding to "LL." If the writing temperature is high and the reproducing temperature is high, the parameter setting controller 350 controls the filter/equalizer 303, the Viterbi decoder 304, and the post-processor 305 to set their parameters according to parameter setting values corresponding to "HH."

When the ambient temperature of an HDD decreases, a distance between the head 176 or 301 and the disk increases and a signal level drops, and thereby a frequency characteristic is deteriorated. This appears in common in the writing and reproducing processes. Thus, an equalizer boost amount for increasing a frequency component lost according to the writing temperature and the reproducing temperature is set to the parameter of the filter/equalizer 303. That is, if the writing temperature is low and the reproducing temperature is also low, the parameter of the filter/equalizer 303 is set so that the boost amount is maximized. If the writing temperature is high and the reproducing temperature is also high, the parameter of the filter/equalizer 303 is set so that the boost amount is minimized.

If the ambient temperature of the HDD decreases when data is written, the distance between the writing head 176 or reading head 301 and the disk increases and the signal level drops, and accordingly, if the frequency characteristic is deteriorated, interference between codes increases, thereby causing an increase of a nonlinear distortion. The nonlinear distortion can be solved by setting the parameter of the Viterbi decoder 304 when the data is reproduced. That is, the Viterbi decoder 304 generates a trellis diagram based on a state transition and performs decoding of the data based on the trellis diagram. Here, the nonlinear distortion can be minimized by setting the parameter of the Viterbi decoder 304 according to the writing temperature and the reproducing temperature.

In addition, for the disk, an error due to electrical noise and an error due to media noise are generated. The media noise increases when the ambient temperature of the disk decreases. The error due to electrical noise is generated in both cases where a magnetic inverse exists and the magnetic inverse does not exist. Compared to this, the error due to media noise is mainly generated in the case where the magnetic inverse exists, whereas the error due to media noise is scarcely generated in the case where the magnetic inverse does not exist. For the media noise, when the post-processor 305 reevaluates the error according to the decoding performed by the Viterbi decoder 304, the post-processor 305 performs differently when the magnetic inverse exists and when the magnetic inverse does not exist. That is, if the writing temperature is low and the reproducing temperature is also low, the reevaluation is performed by determining that the reliability of data when the magnetic inverse exists is low and the reliability of data when the magnetic inverse does not exist is high since the probability of generating the media noise is high. If the writing temperature is high and the reproducing temperature is also high, the reevaluation is performed by determining that the reliability of data when the magnetic inverse exists and the reliability of data when the magnetic inverse does not exist are hardly changed since the probability of generating the media noise is low.

As described above, in the present exemplary embodiment, a data writing error rate and a data reproducing error rate can be improved by reflecting the writing temperature and the reproducing temperature when setting the parameters of the filter/equalizer 303, the Viterbi decoder 304, and the post-processor 305.

A disk writing method according to an exemplary embodiment of the present invention will now be described in detail with reference to FIG. 4.

Figure 4:
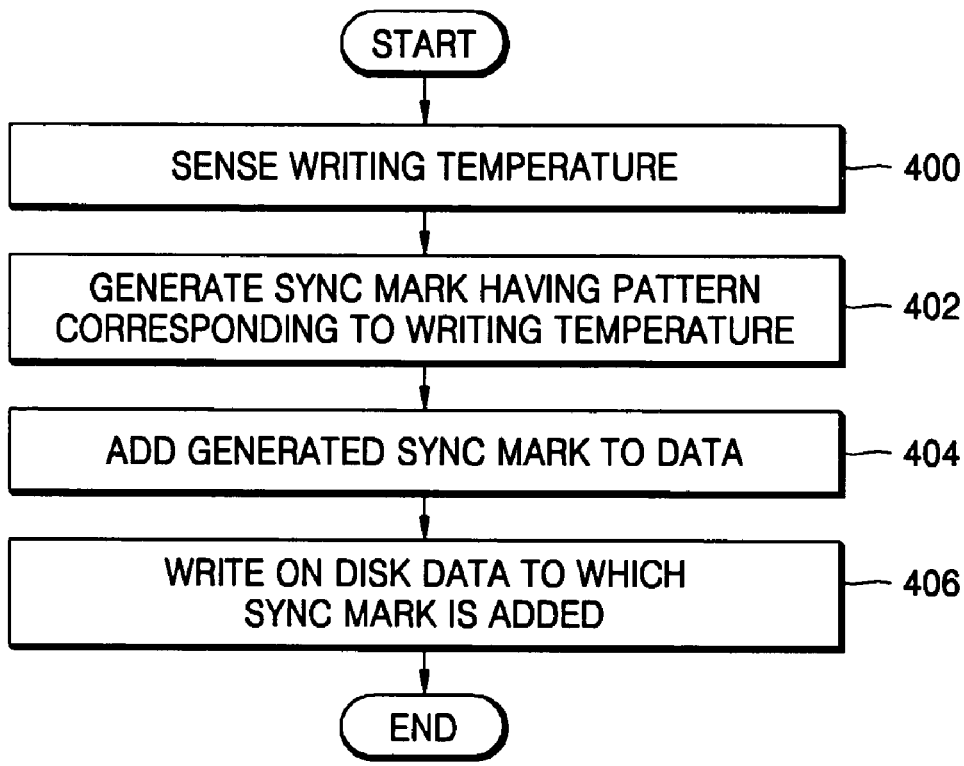
FIG. 4 is a flowchart illustrating a disk writing method according to an exemplary embodiment of the present invention.

FIG. 4 is a flowchart illustrating a disk writing method according to an exemplary embodiment of the present invention.

In operation 400, a writing temperature indicating an ambient temperature at which data is written on a disk is sensed. Here, the sensed writing temperature is converted to a digital signal.

In operation 402, a sync mark having a pattern corresponding to the sensed writing temperature is generated. The sync mark indicates the head of the data to be written. When the sync mark is generated, the sync mark having the pattern corresponding to the sensed writing temperature is generated.

In operation 404, the generated sync mark is added to the data. Here, the sync mark is added to RLL-encoded data. A preamble is added to a non-sync mark portion of the data.

In operation 406, the data to which the sync mark is added is written on the disk.

Figure 5:
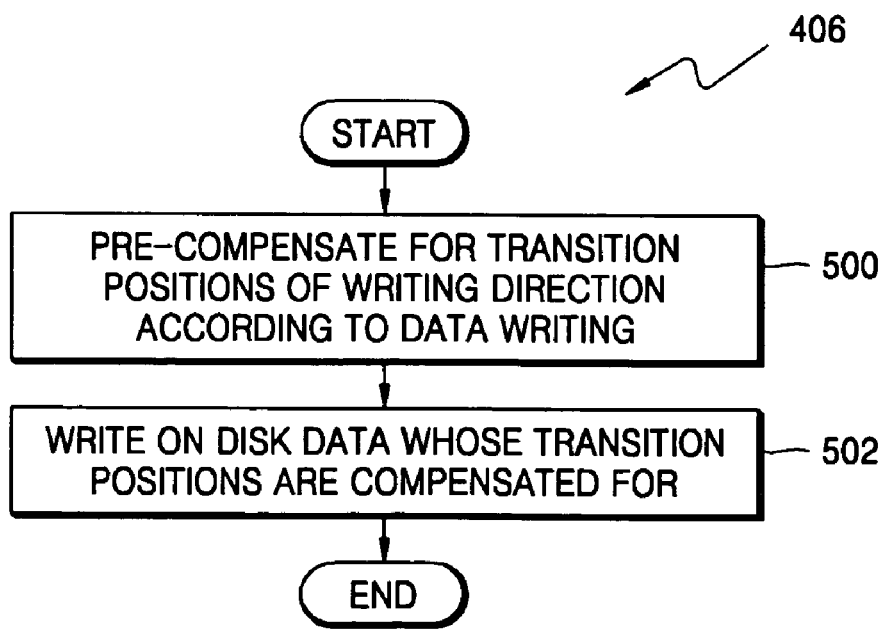
FIG. 5 is a flowchart illustrating operation 406 illustrated in FIG. 4.

FIG. 5 is a flowchart illustrating operation 406 illustrated in FIG. 4.

In operation 500, transition positions of a writing direction according to data writing are pre-compensated for. Here, a compensation amount for pre-compensating for the transition positions of the writing direction is set according to the writing temperature sensed in operation 400.

In operation 502, the data of which the transition positions are pre-compensated for is written on the disk. Here, a writing current and an overshoot to write the data on the disk are set according to the writing temperature sensed in operation 400.

A disk reproducing method according to an exemplary embodiment of the present invention will now be described in detail with reference to FIG. 6.

Figure 6:
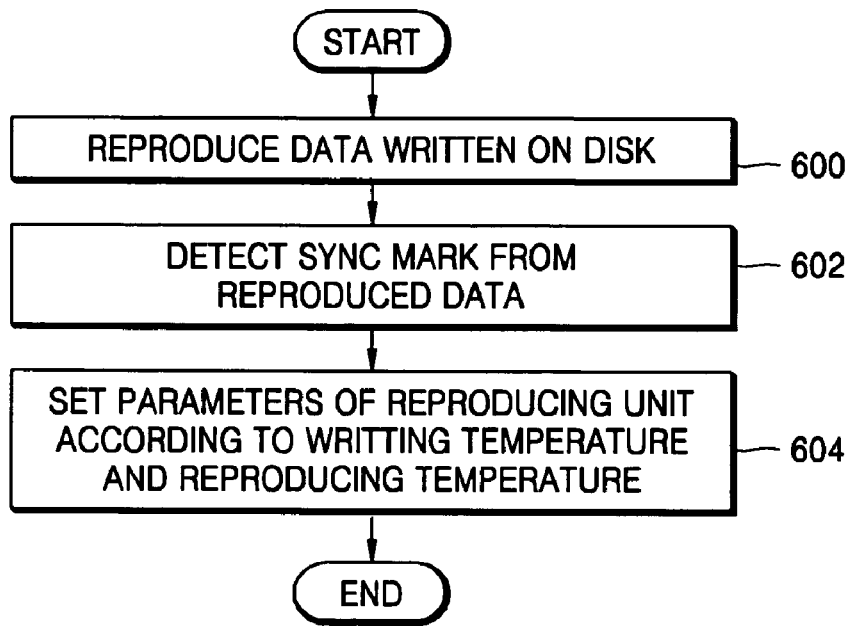
FIG. 6 is a flowchart illustrating a disk reproducing method according to an exemplary embodiment of the present invention.

FIG. 6 is a flowchart illustrating a disk reproducing method according to an exemplary embodiment of the present invention.

In operation 600, data written on a disk is reproduced.

Figure 7:
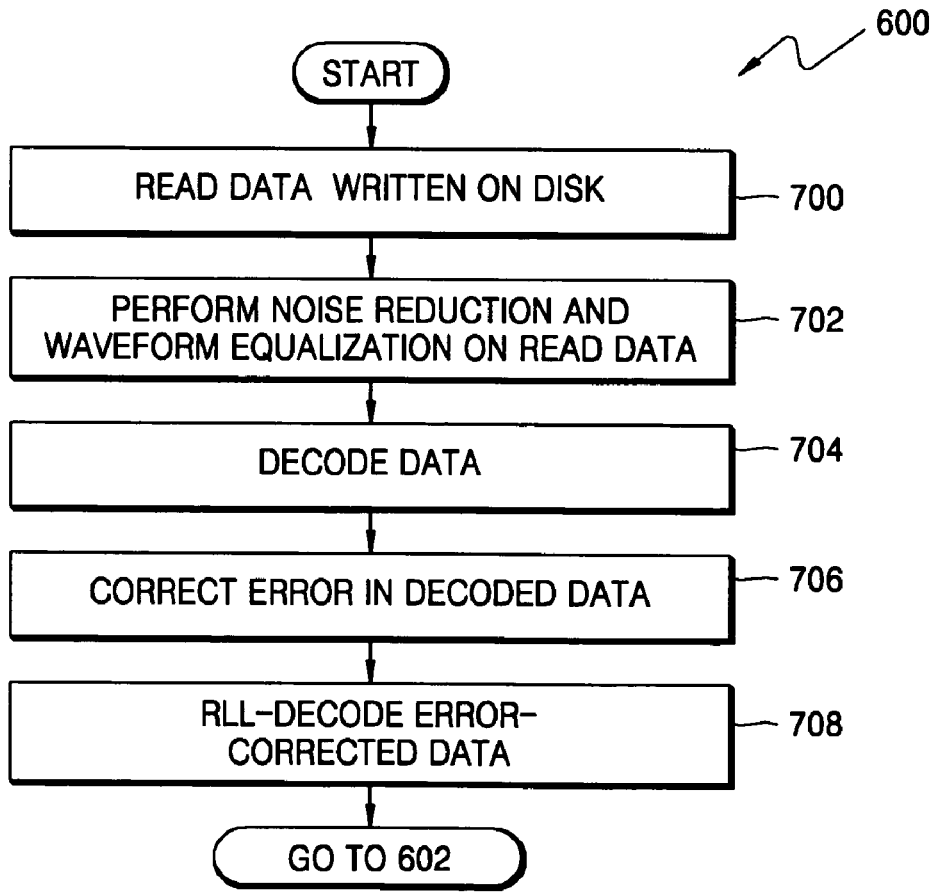
FIG. 7 is a flowchart illustrating operation 600 illustrated in FIG. 6.

FIG. 7 is a flowchart illustrating operation 600 illustrated in FIG. 6.

In operation 700, the data written on the disk is read.

In operation 702, noise reduction and waveform equalization on the read data are performed.

In operation 704, the noise-reduced and waveform-equalized data is decoded.

In operation 706, an error of the decoded data is corrected.

In operation 708, the error-corrected data is RLL decoded.

In operation 602, a sync mark is detected from the noise-reduced and waveform-equalized data. The data written on the disk includes a sync mark having a different pattern according to an ambient temperature at which the data is written as illustrated in FIG. 2A, 2B, or 2C. The sync mark is detected from the data in which the sync mark is included. The ambient temperature at which the data is written, i.e., a writing temperature, can be determined by detecting the sync mark.

In operation 604, parameters of a reproducing unit are set so that the writing temperature determined from the detected sync mark and the data correspond to a reproducing temperature indicating an ambient temperature at which the data is reproduced. The sensed reproducing temperature is converted to a digital signal, and the parameters of the reproducing unit are set using the reproducing temperature and writing temperature, which are converted to digital signals. That is, a parameter for the noise reduction and waveform equalization is set according to the reproducing temperature and writing temperature. A parameter for decoding the data is also set according to the reproducing temperature and writing temperature. A parameter for error correction is also set according to the reproducing temperature and writing temperature.

As described above, according to exemplary embodiments of the present invention, by writing an ambient temperature at which data is written as a sync mark having one of a plurality of patterns, obtaining the ambient temperature at which the data is written from the pattern of the sync mark when the data is reproduced, and setting parameters of devices included in a disk writing/reproducing apparatus using the ambient temperature at which the data is written and an ambient temperature at which the data is reproduced, compensation in a reproducing process can be optimised by considering deterioration of a frequency characteristic and occurrence of linear distortion when the data is written.

In addition, error rates when data is written and when data is reproduced are improved.

In addition, by storing parameters in a parameter table in advance, a setting value of each circuit can be quickly changed based on an ambient temperature at which data is written and an ambient temperature at which the data is reproduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A disk writing apparatus comprising:
   a temperature sensor which senses a writing temperature indicating an ambient temperature of a disk when data is written on the disk;
   a sync mark generator which generates a sync mark indicating a head of data which is written and having a pattern corresponding to the writing temperature sensed by the temperature sensor;
   a multiplexer which adds the sync mark generated by the sync mark generator to the data; and
   a writing unit which writes the data to which the sync mark is added on the disk.

2. The apparatus of claim 1, further comprising:
   an analog-to-digital converter (ADC) which converts the writing temperature sensed by the temperature sensor to a digital writing temperature signal and outputs the digital writing temperature signal to the writing controller; and
   a writing controller which receives the digital writing temperature output by the ADC and outputs the digital writing temperature to the sync mark generator.

3. The apparatus of claim 1, wherein the multiplexer adds the sync mark to the data which is Run Length Limited encoded.

4. The apparatus of claim 1, wherein the multiplexer adds a preamble to the data.

5. The apparatus of claim 2, wherein the writing unit comprises:
   a writing compensator which pre-compensates for transition positions of a writing direction according to writing of the data;
   a writing head which writes on the disk data whose transition positions are pre-compensated for; and
   a writing driver which controls the writing head to write on the disk the data whose transition positions are pre-compensated for.

6. The apparatus of claim 5, wherein the writing controller outputs the writing temperature to the writing compensator, and a compensation amount of the writing compensator is set according to the writing temperature.

7. The apparatus of claim 5, wherein the writing controller outputs the writing temperature to the writing driver, and a writing current and an overshoot of the writing driver are set according to the writing temperature.

8. A disk reproducing apparatus comprising:
a temperature sensor which senses a reproducing temperature indicating an ambient temperature of a disk at which data is reproduced from the disk;
a reproducing unit which reproduces the data written on the disk;
a sync mark detector which detects a sync mark from the data reproduced by the reproducing unit; and
a parameter setting controller which controls setting of parameters of the reproducing unit according to a writing temperature, which indicates an ambient temperature at which the data was written and is obtained from the sync mark detected by the sync mark detector, and the reproducing temperature sensed by the temperature sensor.

9. The apparatus of claim 8, further comprising:
an analog-to-digital converter (ADC) which the reproducing temperature sensed by the temperature sensor to a digital reproducing temperature signal and outputs the digital reproducing temperature signal; and
a reproducing controller which receives the digital reproducing signal from the ADC and outputs the digital reproducing temperature to the parameter setting controller.

10. The apparatus of claim 8, wherein the reproducing unit comprises:
a reading head which reads the data written on the disk;
a filter/equalizer which performs noise reduction and waveform equalization on the data read from the disk by the reading head;
a reproducing pre-amplifier which outputs the data read by the reading head to the filter/equalizer;
a Viterbi decoder which decodes the data output from the filter/equalizer;
a post-processor which corrects an error in the data decoded by the Viterbi decoder; and
a Run Length Limited (RLL) decoder which RLL-decodes the data which is error-corrected.

11. The apparatus of claim 10, wherein a parameter of the filter/equalizer is set by the parameter setting controller.

12. The apparatus of claims 10, wherein a parameter of the Viterbi decoder is set by the parameter setting controller.

13. The apparatus of claim 10, wherein a parameter of the post-processor is set by the parameter setting controller.

14. A disk writing method comprising:
sensing a writing temperature indicating an ambient temperature at which data is written on a disk;
generating a sync mark indicating a head of data which is written and having a pattern corresponding to the writing temperature which is sensed;
adding the sync mark to the data; and
writing on the disk the data to which the sync mark has been added.

15. The method of claim 14, further comprising converting the writing temperature which is sensed to a digital writing temperature signal after the sensing of the writing temperature.

16. The method of claim 14, wherein, in the adding of the sync mark, the sync mark is added to data which is Run Length Limited (RLL)-encoded.

17. The method of claim 14, wherein, in the adding of the sync mark to the data, a preamble is added to the data.

18. The method of claims 14, wherein the writing of the data comprises:
pre-compensating for transition positions of a writing direction according to writing of the data; and
writing on the disk data whose transition positions are pre-compensated for.

19. The method of claim 18, wherein a compensation amount to be compensated for the pre-compensating is set according to the writing temperature.

20. The method of claim 18, wherein a writing current and a overshoot for the writing of the data are set according to the writing temperature.

21. A disk reproducing method comprising:
reproducing data written on a disk;
detecting a sync mark from the data written on the disk; and
setting parameters of a reproducing unit reproducing the written data according to a writing temperature indicating an ambient temperature at which the data was written, which is determined from the sync mark, and a reproducing temperature indicating an ambient temperature at which the written data is reproduced.

22. The method of claim 21, wherein the reproducing temperature is converted to a digital signal.

23. The method of claim 21, wherein the reproducing of the data written on the disk comprising:
reading the data written on the disk;
performing noise reduction and waveform equalization on the data; which is read
decoding the data which is noise-reduced and waveform-equalized;
correcting an error in the data which is decoded; and
performing Run Length Limited (RLL)-decoding on the data which is error-corrected.

24. The method of claims 23, wherein a parameter for the performing the noise reduction and waveform equalization is set according to the writing temperature and the reproducing temperature.

25. The method of claim 23, wherein a parameter for performing the RLL decoding is set according to the writing temperature and the reproducing temperature.

26. The method of claim 23, wherein a parameter for the correcting of the error is set according to the writing temperature and the reproducing temperature.

27. The apparatus of claim 5, wherein the transition positions of the writing direction are positions where the writing direction of the writing unit changes.

28. The method of claim 18, wherein the transition positions of the writing direction are positions where the writing direction of the writing unit changes.

* * * * *